(12) United States Patent
Wu (10) Patent No.: US 12,261,518 B2
(45) Date of Patent: Mar. 25, 2025

(54) ENHANCED GATE DRIVER

(71) Applicant: Murata Manufacturing Co., Ltd., Kyoto (JP)

(72) Inventor: Gary Chunshien Wu, San Diego, CA (US)

(73) Assignee: Murata Manufacturing Co., Ltd., Kyoto (JP)

( * ) Notice: Subject to any disclaimer, the term of this patent is extended or adjusted under 35 U.S.C. 154(b) by 338 days.

(21) Appl. No.: 17/969,557

(22) Filed: Oct. 19, 2022

(65) Prior Publication Data

US 2024/0136909 A1 Apr. 25, 2024
US 2024/0235369 A9 Jul. 11, 2024

(51) Int. Cl.
*H02M 1/08* (2006.01)
*H02M 1/088* (2006.01)
*H02M 7/5387* (2007.01)

(52) U.S. Cl.
CPC ............. *H02M 1/08* (2013.01); *H02M 1/088* (2013.01); *H02M 7/5387* (2013.01)

(58) Field of Classification Search
CPC ....................................................... H02M 1/08
See application file for complete search history.

(56) References Cited

U.S. PATENT DOCUMENTS

| | | | | |
|---|---|---|---|---|
| 5,644,265 A | * | 7/1997 | Austin | ........... H03K 19/018521 327/333 |
| 6,424,174 B1 | * | 7/2002 | Nowak | ............. H03K 19/0016 326/27 |
| 2011/0298438 A1 | * | 12/2011 | Shi | .......................... H02M 1/08 323/282 |
| 2019/0051648 A1 | * | 2/2019 | Kakimoto | ........... H01L 27/0629 |

* cited by examiner

*Primary Examiner* — Jue Zhang
*Assistant Examiner* — Lakaisha Jackson
(74) *Attorney, Agent, or Firm* — Haynes and Boone, LLP (57) ABSTRACT

Circuitry and methods for an improved gate driver circuit for power converters. The improved gate driver circuit substantially reduces propagation delay and transition losses in the floating-gate side of the gate driver circuit. One embodiment includes an inverter having an input configured to receive a state transition signal and an output configured to be coupled to a control input of a switching device. The inverter includes a first NFET having a control gate configured to be coupled to the state transition signal, a second NFET having a control gate coupled to the output of a reference circuit, and a PFET having a control gate configured to be coupled to the state transition signal, wherein the output of the inverter is a node between the conduction channels of the first NFET and the second NFET and the conduction channels of the first NFET, second NFET, and PFET are coupled in series.

19 Claims, 7 Drawing Sheets

502 — Inverting a received state transition signal to an output signal using an inverter having an input configured to receive the state transition signal and an output node coupled to the control input of a switching device, the inverter including:
(1) a first NFET having a conduction channel coupled to the output of the switching device, and a control gate coupled to the state transition signal;
(2) a second NFET having a conduction channel coupled in series with the conduction channel of the first NFET, and a control gate coupled to a reference voltage based on a voltage present on the output of the switching device; and
(3) a PFET having a conduction channel coupled to a first voltage source and being coupled to the conduction channel of the second NFET, and a control gate configured to be coupled to the state transition signal, wherein the output node of the inverter is between the conduction channels of the first NFET and the second NFET 504 — Applying the output signal from the output node of the inverter to the control input of the switching device

FIG. 5

ENHANCED GATE DRIVER

BACKGROUND

(1) Technical Field

This invention relates to electronic circuits, and more particularly to gate driver circuits for power converter circuits, including DC-DC power converter circuits.

(2) Background

Many electronics in various applications (including but not limited to mobile computing, high-performance computing, communications, automotive, and industrial) require multiple voltage levels. For example, in many high-performance computing applications, a 12V standard power supply provides power to the electronic system, whereas microprocessors and FPGAs within those systems may require a low voltage level (e.g., 1-2V), while still other circuitry may require an intermediate voltage level (e.g., 5-10V).

Power converters are often used to generate a lower or higher voltage from a common power source, such as a battery. Power converters include DC-DC or AC-DC converters. Power converters which generate a lower output voltage level from a higher input voltage power source are commonly known as buck converters, so-called because $V_{OUT}$ is less than $V_{IN}$, and hence the converter is "bucking" the input voltage. Power converters which generate a higher output voltage level from a lower input voltage power source are commonly known as boost converters, because $V_{OUT}$ is greater than $V_{IN}$. Some power converters may be either a buck converter, a boost converter, or a buck-boost converter. Some power converters may provide an inverted output.

Figure 1:
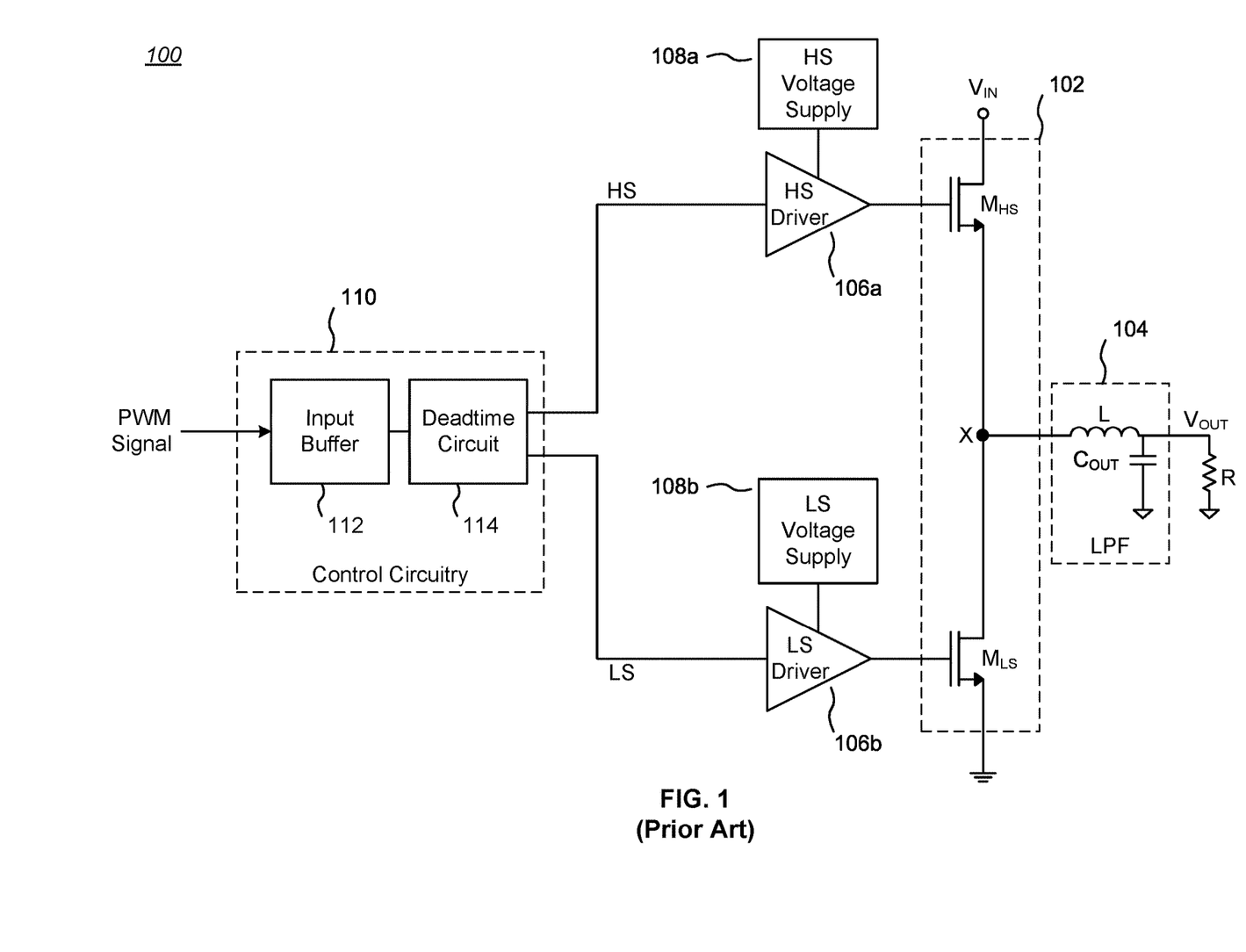
FIG. 1 is a block diagram of one example of a prior art buck power converter.

FIG. 1 is a block diagram of one example of a prior art buck power converter 100. A half-bridge power stage 102 comprises a "high side" power device (e.g., a MOSFET) $M_{HS}$ and "low side" power device $M_{LS}$ having their respective conduction channels between their respective drains and sources coupled in series. The half bridge power stage 102 is coupled to an output lowpass filter (LPF) 104 that includes, in this example, an inductor L and an output capacitor $C_{OUT}$.

A voltage $V_{IN}$ applied to $M_{HS}$ is converted by the half-bridge power stage 102 and the output LPF 104 to a lower output voltage $V_{OUT}$ that may be applied to a coupled load (represented as a resistor R in this example). The control inputs (e.g., FET gates) of both power devices $M_{HS}$, $M_{LS}$ are alternately driven to conductive (ON) states by respective high-side and low-side drivers 106a, 106b, each of which is powered by a respective high-side and low-side voltage supply 108a, 108b. In some embodiments, the low-side voltage supply 106b may be $V_{IN}$. When the high-side power device $M_{HS}$ is ON, $C_{OUT}$ is coupled to $V_{IN}$, while when the low-side power device $M_{LS}$ is ON, $C_{OUT}$ is coupled to ground. The value of $V_{OUT}$ depends on the ratio of ON time of $M_{HS}$ with respect to ON time of $M_{LS}$.

Control circuitry 110 provides a set of control signals to the high-side and low-side drivers 106a, 106b that regulate the ON-OFF duty cycle of the power devices $M_{HS}$, $M_{LS}$. In the illustrated example, the control circuitry 110 receives a pulse-width modulation (PWM) signal responsive to the power requirements to the load (which may vary with time). The PWM signal in this example is applied to an input buffer 112, which in turn provides a buffered PWM signal to a conventional deadtime circuit 114. The deadtime circuit 114 outputs complementary versions HS, LS of the PWM signal to the power devices $M_{HS}$, $M_{LS}$, respectively, with a slight modification to the respective complementary PWM signals HS, LS to insure a deadtime between when both power devices $M_{HS}$, $M_{LS}$ are turned ON, in order to avoid "shoot through" from $V_{IN}$ to ground (i.e., a direct connection from $V_{IN}$ to ground which would occur if both power devices $M_{HS}$, $M_{LS}$ were conductive at the same time).

There is a need for a power converter architecture that is efficient. The present invention meets this need.

SUMMARY

The present invention encompasses circuitry and methods for an improved gate driver circuit for power converters, including buck power converter circuits and charge pumps. The improved gate driver circuit substantially reduces propagation delay, and attendant transition losses, in the floating-gate side of the gate driver circuit.

One embodiment includes a driver circuit including: a reference circuit having an input configured to be coupled to an output of a switching device and an output providing a regulated voltage; and an inverter having an input configured to receive a state transition signal and an output configured to be coupled to a control input of the switching device, the inverter including: a first NFET having a conduction channel configured to be coupled to the output of the switching device, and a control gate configured to be coupled to the state transition signal; a second NFET having a conduction channel coupled in series with the conduction channel of the first NFET, and a control gate coupled to the output of the reference circuit; and a PFET having a conduction channel coupled in series between a first voltage source and the conduction channel of the second NFET, and a control gate configured to be coupled to the state transition signal, wherein the output of the inverter is a node between the conduction channels of the first NFET and the second NFET.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION

The present invention encompasses circuitry and methods for an improved gate driver circuit for power converters, including buck power converter circuits and charge pumps. The improved gate driver circuit substantially reduces propagation delay, and attendant transition losses, in the floating-gate side of the gate driver circuit.

Figure 2A:
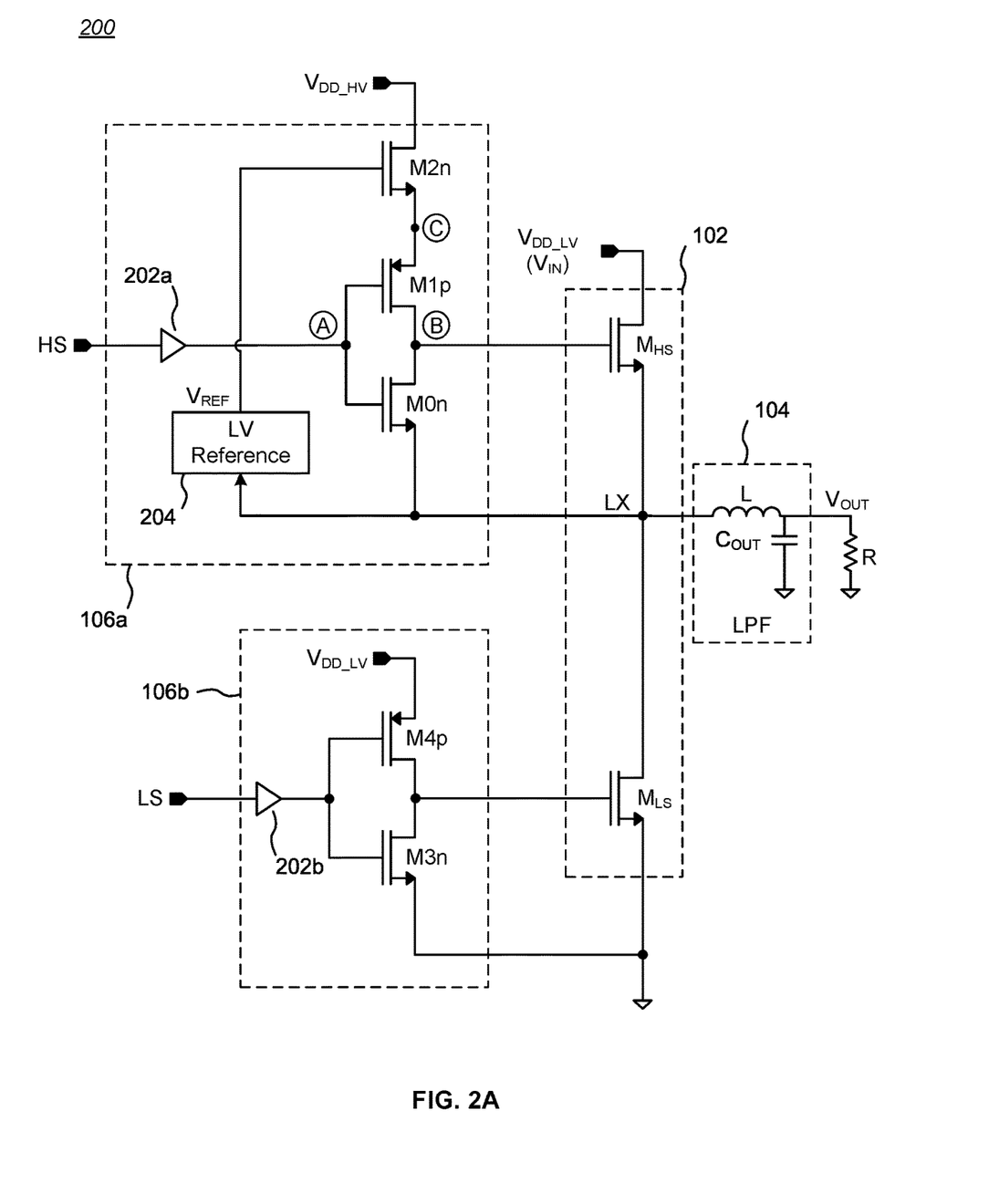
FIG. 2A is a schematic diagram of a first gate driver suitable for use with, for example, a power conversion circuit.

FIG. 2A is a schematic diagram 200 of a first gate driver circuit suitable for use with, for example, a power conversion circuit. FIG. 2A is similar to FIG. 1 but omits the control circuitry 110 to avoid clutter and provides greater details of one embodiment of the high-side and low-side drivers 106a, 106b.

In the illustrated example, a half-bridge power stage 102 comprises a "high side" power device $M_{HS}$ and "low side" power device $M_{LS}$. A node LX of the half bridge power stage 102 is coupled to an output low-pass filter (LPF) 104 that includes, in this example, an inductor L and an output capacitor $C_{OUT}$. The inductor L and output capacitor $C_{OUT}$ may be external components to an integrated circuit (IC) embodiment of the half-bridge power stage 102 and related circuitry.

A voltage $V_{DD\_LV}$ (corresponding to $V_{IN}$ in FIG. 1) applied to the drain of $M_{HS}$ is downconverted by the half-bridge power stage 102 and the output LPF 104 to a lower output voltage $V_{OUT}$ that may be applied to a coupled load (represented as a resistor R in this example). In an example embodiment, $V_{DD\_LV}$ may be about 1.8V. The control inputs (e.g., FET gates) of both power devices $M_{HS}$, $M_{LS}$ are alternately driven by respective high-side and low-side drivers 106a, 106b. When $M_{HS}$ is ON, $C_{OUT}$ is coupled to and at least partially charged by $V_{IN}$, while when the $M_{LS}$ is ON, $C_{OUT}$ is coupled to and at least partially discharged by circuit ground. The value of $V_{OUT}$ depends on the ratio of ON time of $M_{HS}$ with respect to ON time of $M_{LS}$.

N-type MOSFETs (NFETs) are often used as power devices in switching power converters because their low $R_{ON}$ per given area improves efficiency per area. However, turning the high-side NFET $M_{HS}$ completely ON requires a gate voltage $V_G$ higher than the source voltage Vs at node LX. This problem is made more difficult because the source voltage at node LX transitions between about 0V and about $V_{DD\_LV}$ (eventually, as $M_{HS}$ turns ON), since during normal operation, either high-side FET $M_{HS}$ or the low-side FET $M_{LS}$ is ON. Under this turn-on behavior, the gate voltage $V_G$ for $M_{HS}$ needs to be sufficiently higher than the voltage at node LX for the high-side NFET $M_{HS}$ to fully convey the input voltage $V_{DD\_LV}$ at its drain terminal to its source terminal with minimal voltage drop across its drain-to-source channel so as to keep power loss through NFET $M_{HS}$ to an optimal value. Accordingly, the high-side driver 106a must be biased so as to generate a sufficiently high gate voltage $V_G$ to reliably turn $M_{HS}$ completely ON.

The high-side driver 106a in the illustrated example includes an NFET M0n and a P-type FET (PFET) M1p having their conduction channels between their respective drains and sources coupled in series, with their respective gates coupled to the output of a voltage buffer 202a at node A. The voltage buffer 202a receives a state transition signal comprising the high-side PWM signal HS, and may be implemented in some embodiments as an even number of inverters coupled in series. If the circuit generating the HS signal has sufficient driving ability, the voltage buffer 202a may be omitted unless desired for delay matching purposes with respect to the low-side path.

In greater detail, M0n has its source coupled to the node LX and its drain coupled to the gate of the high-side power NFET $M_{HS}$ through a node B. The PFET M1p has its drain coupled to the gate of the high-side power NFET $M_{HS}$ through node B. The source of an NFET M2n is coupled to the source of M1p at a node C. The drain of M2n is coupled to a voltage $V_{DD\_HV}$ that is higher than $V_{DD\_LV}$. In an example embodiment, $V_{DD\_HV}$ may be in the range of about 3.3V to 3.6V.

The combination of NFET M0n and PFET M1p behaves as an inverter. When signal HS goes from low to high at node A (a "0" to "1" transition), M0n turns ON and M1p turns OFF, thus coupling the gate of power NFET $M_{HS}$ at node B to the voltage at floating voltage node LX through M0n, thereby reducing the $V_{GS}$ of $M_{HS}$ to 0V, turning NFET $M_{HS}$ OFF (a "1" to "0" transition). Conversely, when signal HS goes from high to low (a "1" to "0" transition), M0n turns OFF and M1p turns ON (since its gate is negative relative to the voltage at its source), thus coupling the gate of power NFET $M_{HS}$ to the voltage at node C (which is derived from $V_{DD\_HV}$ and is greater than the voltage at node LX), turning $M_{HS}$ ON (a "0" to "1" transition).

Of note, a transition by a FET to an ON or OFF state is not an instantaneous action. Depending on the type of FET, the gate of the FET must either be charged or discharged to allow or block conduction through the channel of the FET, which takes time. Further, the ON resistance $R_{ON}$ of a FET is dependent on how much the gate-to-source voltage, $V_{GS}$, exceeds the threshold voltage $V_{TH}$ of the FET, and the change in $R_{ON}$ may take an appreciable amount of time that affects other circuitry. Thus, it should be appreciated that voltages on various nodes within a FET-based circuit may exhibit different values over time during state changes of the circuit (see TABLES 1 and 2 below for an example).

While power NFET $M_{HS}$ is characterized as being on the "high" voltage side of the half-bridge power stage 102, $M_{HS}$ would normally be implemented as a low-voltage (and thus smaller and more efficient) device in light of the relatively low value of $V_{DD\_LV}$. The purpose of NFET M2n is to limit the floating supply voltage to the inverter circuit comprising M1p and M0n so that the maximum $V_{GS}$ of the low-voltage power NFET $M_{HS}$ applied through node B does not exceed the design limit of $M_{HS}$. To that end, the gate of M2n is coupled to the output of a low-voltage (LV) reference circuit 204, which in turn is coupled to node LX. The low-voltage reference circuit 204 provides a controlled voltage $V_{REF}$ to the gate of M2n that is approximately equal to the threshold voltage $V_{TH}$ of M2n when power NFET $M_{HS}$ is OFF (non-conducting). The voltage at node C relative to node LX is approximately $V_{REF} - V_{TH}$, and $V_{REF}$ can be set to a voltage such that $V_{REF} - V_{TH}$ does not exceed about the gate breakdown voltage of NFET $M_{HS}$. In some embodiments, the low-voltage reference circuit 204 may include a Zener diode. For example, if the $V_{TH}$ of M2n is 0.5V, then the output $V_{REF}$ of the low-voltage reference circuit 204 when power NFET $M_{HS}$ is OFF should be set to about 0.5V. When power NFET $M_{HS}$ is OFF, its $V_{GS}$ should be 0V and NFET $M_{LS}$ should be ON, so node LX is at 0V. Accordingly, M2n would be at or near its OFF (non-conducting) state and thus highly resistive. As the voltage at node LX builds up when power NFET $M_{HS}$ transitions to an ON state, M2n will momentarily become more conductive but still limit the voltage at node C to a range that is within the design limit for the maximum $V_{GS}$ of the low-voltage power NFET $M_{HS}$ when M1p is fully conductive. In steady state, M2n is always OFF because one of M1p and M0n would be OFF, so there is no DC path from node C to node LX.

In contrast to the high-side driver 106a, the low-side driver 106b is more straight-forward. The low-side driver 106b includes an NFET M3n and a PFET M4p having their conduction channels between their respective drains and sources coupled in series, with their respective gates coupled to the output of a voltage buffer 202b. The voltage buffer 202b receives a state transition signal comprising the low-side PWM signal LS and may be implemented in some embodiments as an even number of inverters coupled in series. If the circuit generating the LS signal has sufficient driving ability, the voltage buffer 202b may be omitted unless desired for delay matching purposes with respect to the high-side path.

In greater detail, NFET M3n has its source coupled to circuit ground and its drain coupled to the gate of the low-side NFET $M_{LS}$. The PFET M4p has its drain coupled to the gate of low-side NFET $M_{LS}$ and its source coupled to (or at least derived from) $V_{DD\_LV}$. $V_{DD\_LV}$ is chosen to limit the maximum voltage as required by the $V_{GS}$ of NFET $M_{LS}$. In alterative embodiments, the source voltage for PFET M4p may have a different value than $V_{DD\_LV}$.

The combination of NFET M3n and PFET M4p also behaves as an inverter. When signal LS goes from low-to-high (a "0" to "1" transition), M3n turns ON and M4p turns OFF, thus coupling the gate of power NFET $M_{LS}$ to circuit ground, effectively turning $M_{LS}$ OFF (a "1" to "0" transition). Conversely, when signal LS goes from high-to-low (a "1" to "0" transition), M3n turns OFF and M4p turns ON (since its gate is negative relative to the voltage at its source), thus coupling the gate of power NFET $M_{LS}$ to $V_{DD\_LV}$, turning $M_{LS}$ ON (a "0" to "1" transition).

Figure 2B:
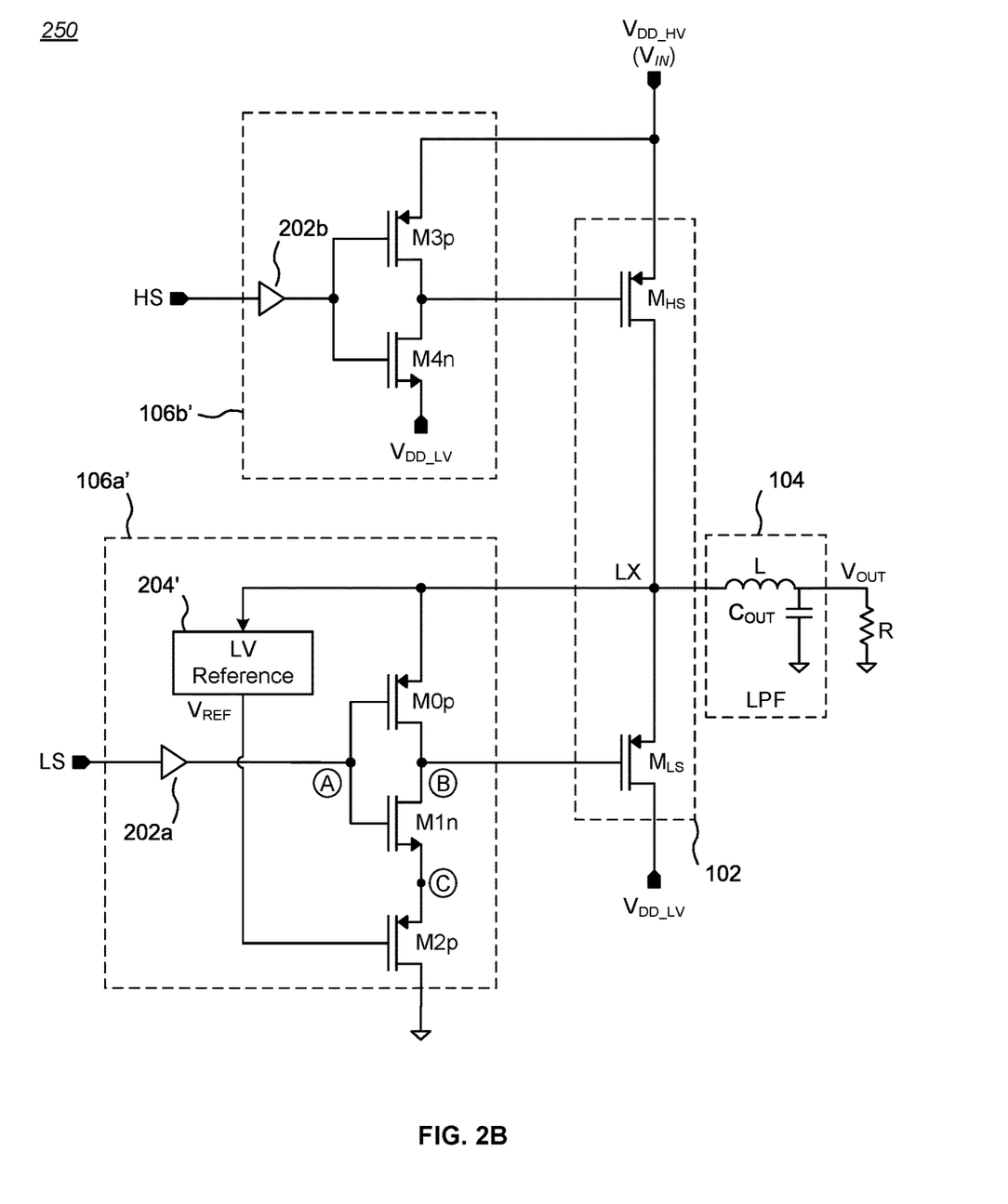
FIG. 2B is a schematic diagram of a second gate driver circuit suitable for use with, for example, a power conversion circuit.

FIG. 2B is a schematic diagram 250 of a second gate driver circuit suitable for use with, for example, a power conversion circuit. FIG. 2B is essentially a "flipped" version of FIG. 2A in which the power devices $M_{HS}$ and $M_{LS}$ are PFETs coupled between $V_{DD\_HV}$ ($V_{IN}$) and $V_{DD\_LV}$, and thus utilizes a variant low-side driver 106a' (which mirrors the high-side driver 106a of FIG. 2A) and a variant high-side driver 106b' (which mirrors the low-side driver 106a of FIG. 2A). In greater detail, PFET M2p has its source coupled to the source of an NFET M1n at a node C. The drain of M2p is coupled to circuit ground. The drain of NFET M1n is coupled to the gate of the high-side power PFET $M_{HS}$ through a node B. A PFET M0p has its drain coupled to the gate of the high-side power PFET $M_{HS}$ through node B and its source is coupled to node LX. The gate of PFET M2p is coupled to a low-voltage reference circuit 204' that is powered by the voltage at node LX. Operation of the variant low-side driver 106a' is otherwise similar to the high-side driver 106a of FIG. 2A. Variant high-side driver 106b' is coupled between $V_{DD\_HV}$ ($V_{IN}$) and $V_{DD\_LV}$, and operation is similar to the low-side driver 106b of FIG. 2A. This PFET version may be useful if there is a need for a $V_{OUT}$ that is referenced to some voltage below $V_{DD\_HV}$ ($V_{IN}$), such that as $V_{IN}$ varies, $V_{OUT}$ would track it. In such a case, the PFET version of FIG. 2B would be fully symmetrical to the NFET version of FIG. 2A, in that the PFET version references $V_{OUT}$ to the highest voltage while the NFET version references to the GND potential.

While the circuit shown in FIG. 2A works, it is slow when making a low-to-high transition at node B (i.e., turning $M_{HS}$ ON) in response to a high-to-low transition at node A. For example, when signal HS to the gates of M0n and M1p goes from high to low (thus transitioning M0n to OFF and M1p to ON), the output of the M0n/M1p inverter at node B transitions from low to high. At the start of the transition, before M1p begins to turn ON, M1p is initially in accumulation mode with its $V_{GS} \gg$ Vth (e.g., $V_{GS}$=+1.5V versus $V_{TH}$=−0.5V) because node LX is essentially at ground level at that time. This means the $V_{GS}$ of M1p needs to decrease by a significant amount before it approaches the threshold voltage $V_{TH}$ of M1P, allowing M1P to start to turn ON, which causes additional delay on top of the normal transition delay of power NFET $M_{HS}$. Once M1p begins to conduct but before node LX fully charges up, the $V_{GS}$ of M1p is only at around −$V_{DD\_LV}$, which is less than −$V_{DD\_HV}$, and thus M1p is not fully ON. A similar problem, but with different signal polarities, occurs with the circuit of FIG. 2B (for example, for the PFET-based circuit shown in FIG. 2B, slow high-to-low transitions at node B occur during low-to-high transitions at node A).

The OFF-to-ON transition delay for power NFET $M_{HS}$ results in transition losses and a longer deadtime between switching between ON states for $M_{HS}$ and $M_{LS}$, thereby reducing the efficiency of the example power converter illustrated in FIG. 2A. For instance, in one example implementation of the circuit shown in FIG. 2A, the OFF-to-ON transition delay for power NFET $M_{HS}$ is about 5-6 ns.

Figure 3A:
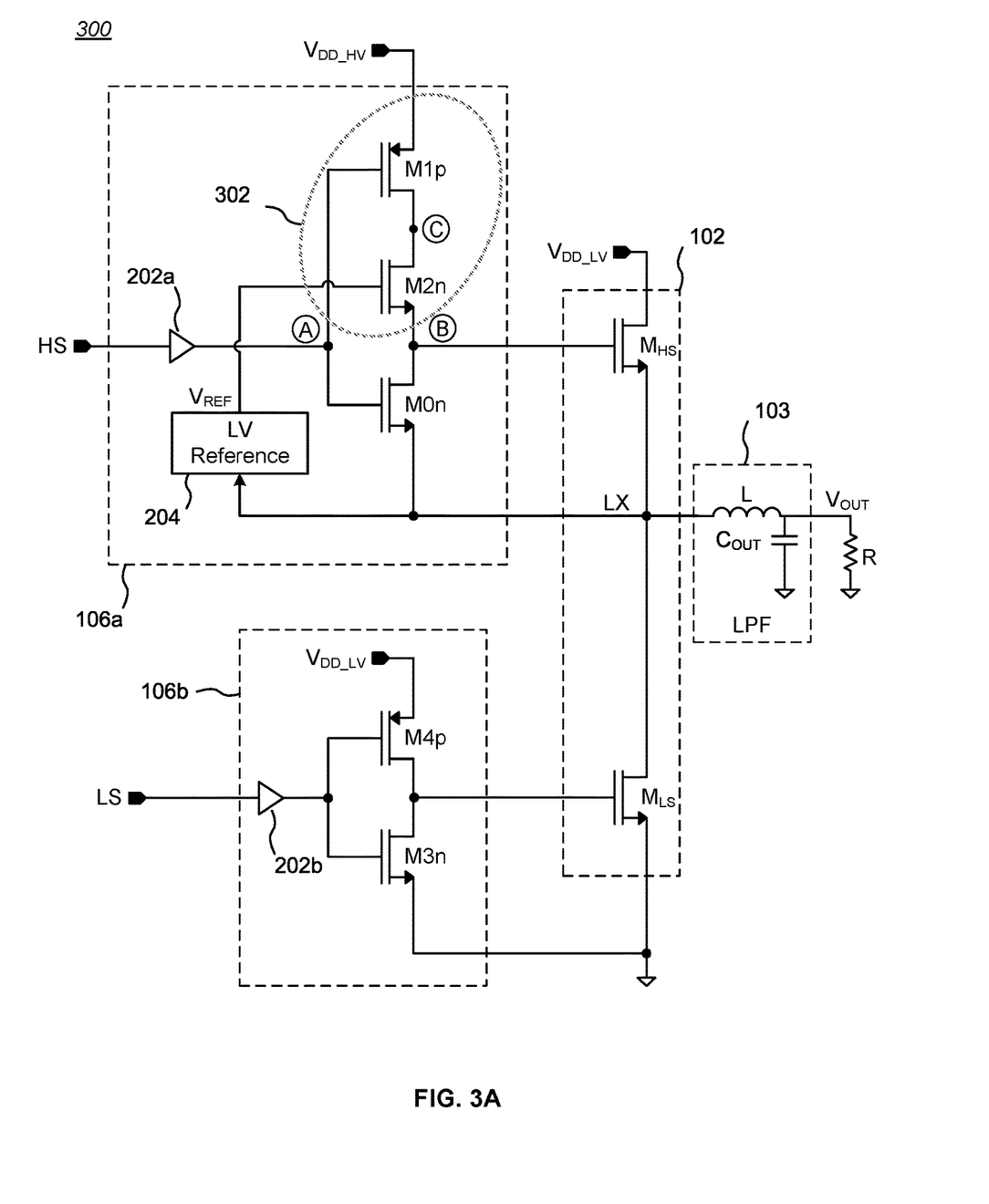
FIG. 3A is a schematic diagram of a first improved gate driver suitable for use with, for example, a power conversion circuit.

FIG. 3A is a schematic diagram of a first improved gate driver suitable for use with, for example, a power conversion circuit. Similar in many structural and operational aspects to the circuit shown in FIG. 2A, a significant difference is that the locations of PFET M1p and NFET M2n, shown within dashed circle 302, are swapped in the high-side driver 106a. That is, the source of M1p is coupled to $V_{DD\_HV}$ and the drain of M1p is coupled through node C to the drain of M2n, while the source of M2n is coupled to the gate of the high-side power NFET $M_{HS}$ through node B. NFET M0n has its source coupled to the node LX and its drain coupled to the gate of the high-side power NFET $M_{HS}$ through node B. Accordingly, the conduction channels between the respective drains and sources of M1p, M2p, and M0n are coupled in series. The gate connections remain the same as in FIG. 2A: the gates of M1p and M0n are coupled to the voltage buffer 202a at node A, and the gate of M2n is coupled to the output of a low-voltage reference circuit 204.

The benefit of the architecture illustrated in FIG. 3A is that the OFF-to-ON transition delay for power NFET $M_{HS}$ is substantially reduced. For instance, in one example implementation of the circuit shown in FIG. 3A, the OFF-to-ON transition delay for power NFET $M_{HS}$ is less than about 2 ns, compared to about 5-6 ns for an example implementation of the circuit shown in FIG. 2A. Consequently, transition delays are reduced by as much as 3 times with implementations of the circuit shown in FIG. 3A.

When signal HS goes from high-to-low (a "1" to "0" transition), PFET M1p initially has a $V_{GS}$ of 0V (e.g., $V_{DD\_HV}$=3V and node A is initially at 3V) and is not in accumulation mode. If, for example, the $V_{TH}$ of PFET M1p is −0.5V, then M1p can turn ON quickly since $V_{GS}$ need only drop from 0V to −0.5V as the transition progresses (i.e., as the voltage at node A declines from, for example, 3V down to 0V). In the meantime, at the start of the high-to-low transition of signal HS (and thus also at node A), NFET M2n is initially in fully inverted mode (i.e., substantially conductive), with its $V_{GS} \gg V_{TH}$ (e.g., $V_{GS}$=+2V versus $V_{TH}$=+0.5V).

As a result, as soon as the input of the M0n/M1p inverter crosses its trip point, the $V_{GS}$ of power NFET $M_{HS}$ approaches the LV reference 204 voltage ($V_{REF}$) minus the $V_{TH}$ of M2n with a short turn-on delay, causing power NFET $M_{HS}$ to turn ON quickly. Note that the trip point can be adjusted higher by increasing the sizes of M1p and M2n relative to M0n, thereby reducing the turn-on delay of $M_{HS}$ further. Thus, the LV reference circuit 204 provides a regulated voltage to the gate of M2n, coupled as shown in FIG. 3A, so as to make M2n substantially conductive at the beginning of a low-to-high voltage transition at the gate of power NFET $M_{HS}$.

Notably, with the circuit of FIG. 3A, there can be a 3× to 4× improvement in the propagation delay from start to finish compared to the circuit of FIG. 2A (e.g., from about 5-6 ns for a model of the circuit of FIG. 2A down to below about 2 ns for a model of the circuit of FIG. 3A).

Figure 3B:
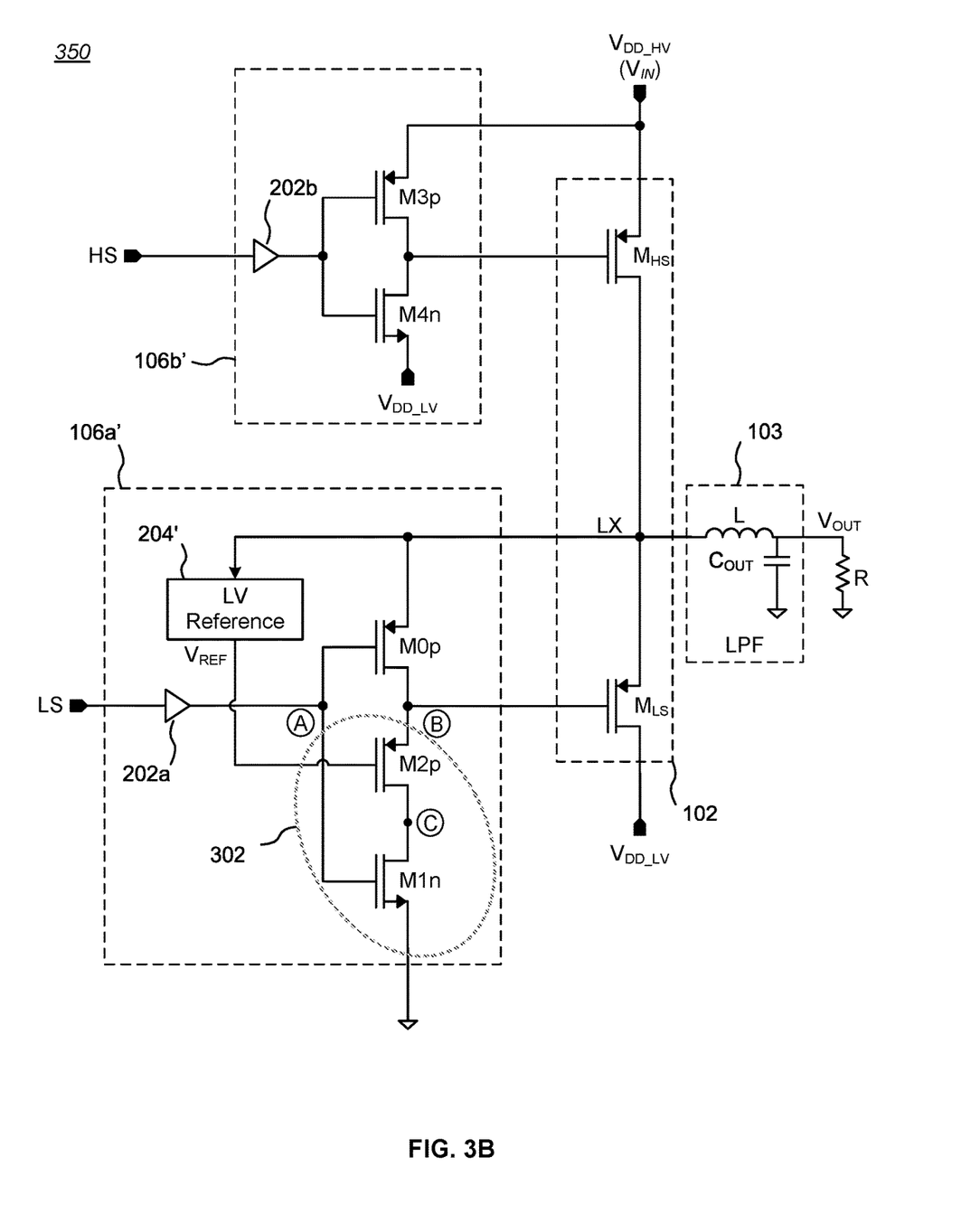
FIG. 3B is a schematic diagram of a second improved gate driver circuit suitable for use with, for example, a power conversion circuit.

FIG. 3B is a schematic diagram of a second improved gate driver circuit suitable for use with, for example, a power conversion circuit. FIG. 3B is essentially a "flipped" PFET version of the NFET-based circuit of FIG. 3A in which the power devices $M_{HS}$ and $M_{LS}$ are PFETs coupled between $V_{DD\_HV}$ ($V_{IN}$) and $V_{DD\_LV}$. The circuit of FIG. 3B uses a variant low-side driver 106a' (which mirrors the high-side driver 106a of FIG. 3A) and a variant high-side driver 106b' (which mirrors the low-side driver 106a of FIG. 3A) in which the FET types within the high-side and low-side drivers are complements of the FETs shown in FIG. 3A and the signal polarities are essentially reversed. For example, at the start of a low-to-high transition of signal LS (and thus also at node A), PFET M2p is initially in fully inverted mode (i.e., substantially conductive). As a result, as soon as the input of the M0p/M1n inverter crosses its trip point, the $V_{GS}$ of power PFET $M_{LS}$ will approaches the LV reference 204' voltage ($V_{REF}$) minus the $V_{TH}$ of M2p with a short turn-on delay, causing power PFET $M_{LS}$ to turn ON quickly. Thus, the LV reference circuit 204' provides a regulated voltage to the gate of M2p, coupled as shown in FIG. 3B, so as to make M2p substantially conductive at the beginning of a high-to-low voltage transition at the gate of power PFET $M_{LS}$.

Example Node Values

To better appreciate the advantages of embodiments of the present invention, it may be useful to compare transistor operating condition models of the circuits of FIG. 2A and FIG. 3A for a high-to-low state change at node A triggered by signal HS. The models assume that $V_{DD\_HV}$=3V, $V_{DD\_LV}$=1.5V, $V_{TH}$ NMOS=0.5V, $V_{TH}$ PMOS=-0.5V, and that PFET M1p and NFET M2n are larger than NFET M0n for the circuit of FIG. 3A.

TABLE 1 below shows voltages at nodes A, B, C, and LX and $V_{GS}$ values for PFET M1p and NFET M2n during a transition from low-to-high of the signal HS at node A in a model of the circuit of FIG. 2A. Similarly, TABLE 2 below shows voltages at nodes A, B, C, and LX and $V_{GS}$ values for PFET M1p and NFET M2n during a rapid transition from high-to-low at node B of the signal HS in a model of the circuit of FIG. 3A. The voltage at node A from 3V down to 0V is shown decreasing in 0.5V steps, but it should be appreciated that the voltage at node A decreases in an essentially continuous manner. The rapid transition is essentially complete when the voltage at node B (i.e., the gate voltage applied to power NFET $M_{HS}$) flips from a low value to a high value, owing to M0n turning OFF and M1p turning ON, thus coupling $V_{DD\_HV}$ to node B through M1p and M2n (note that while the transition is complete when node B goes from low-to-high, power NFET $M_{HS}$ actually starts to turn ON when its $V_{GS}$ is some overdrive voltage above its $V_{TH}$).

TABLE 1

Circuit Model for FIG. 2A

| A | B | C | LX | $V_{GS\_M1p}$ | $V_{GS\_M2n}$ |
|---|---|---|---|---|---|
| 3 | 0 | 1.5 | 0 | 1.5 | 0.5 |
| 2.5 | 0 | 1.5 | 0 | 1 | 0.5 |
| 2 | 0 | 1.5 | 0 | 0.5 | 0.5 |
| 1.5 | 0 | 1.5 | 0 | 0 | 0.5 |
| 1.0 | 0 | 1.5 | 0 | -0.5 | 0.5 |
| 0.5 | 3 | 3 | 1.5 | -0.75 → -1.5 | 0.75 → 0.5 |
| 0 | 3 | 3 | 1.5 | -1.5 | 0.5 |

The → symbol indicates rapid transition

TABLE 2

Circuit Model for FIG. 3A

| A | B | C | LX | $V_{GS\_M1p}$ | $V_{GS\_M2n}$ |
|---|---|---|---|---|---|
| 3 | 0 | 0 | 0 | 0 | 2 |
| 2.5 | 0 | 0 | 0 | -0.5 | 2 |
| 2 | 0 | 0 | 0 | -1 | 2 |
| 1.5 | 3 | 3 | 1.5 | -1.5 | 2 → 0.5 |
| .0 | 3 | 3 | 1.5 | -2 | 0.5 |
| 0.5 | 3 | 3 | 1.5 | -2.5 | 0.5 |
| 0 | 3 | 3 | 1.5 | -3 | 0.5 |

The → symbol indicates rapid transition

In the FIG. 2A circuit model, the rapid transition occurs when the input at node A drops all the way down to 0.5V, whereas in the improved FIG. 3A circuit model, the rapid transition occurs earlier, when the input at node A drops down only to 1.5V.

At the initiation of the rapid transition for the FIG. 2A circuit model, the respective gate voltage $V_{GS}$ for M1p=-0.75V and for M2n=0.75V, which just barely turn those FETs ON, and accordingly those FETs are in a high $R_{ON}$ resistance condition that results in a slow ramp up of the gate voltage for power NFET $M_{HS}$.

At the initiation of the rapid transition for the FIG. 3A circuit model, the respective gate voltage $V_{GS}$ for M1p=-1.5V and for M2n=2V, resulting in a lower $R_{ON}$ resistance condition that enables a faster ramp up of the gate voltage for power NFET $M_{HS}$.

It should be appreciated that the fast transition circuitry of the high-side driver 106a in FIG. 3A may be used in other applications that require switching a relatively low-voltage device while powered from a higher voltage. Thus, applications may exist that do not require the low-side driver 106b. For example, in the case of asynchronous rectification, the low-side driver 106b and power device $M_{LS}$ can be omitted and replaced by a diode.

Circuit Embodiments

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit components or blocks (e.g., filters, amplifiers, passive components, and possibly additional ICs) into one package. The ICs and/or modules are then typically combined with other components, often on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

Figure 4:
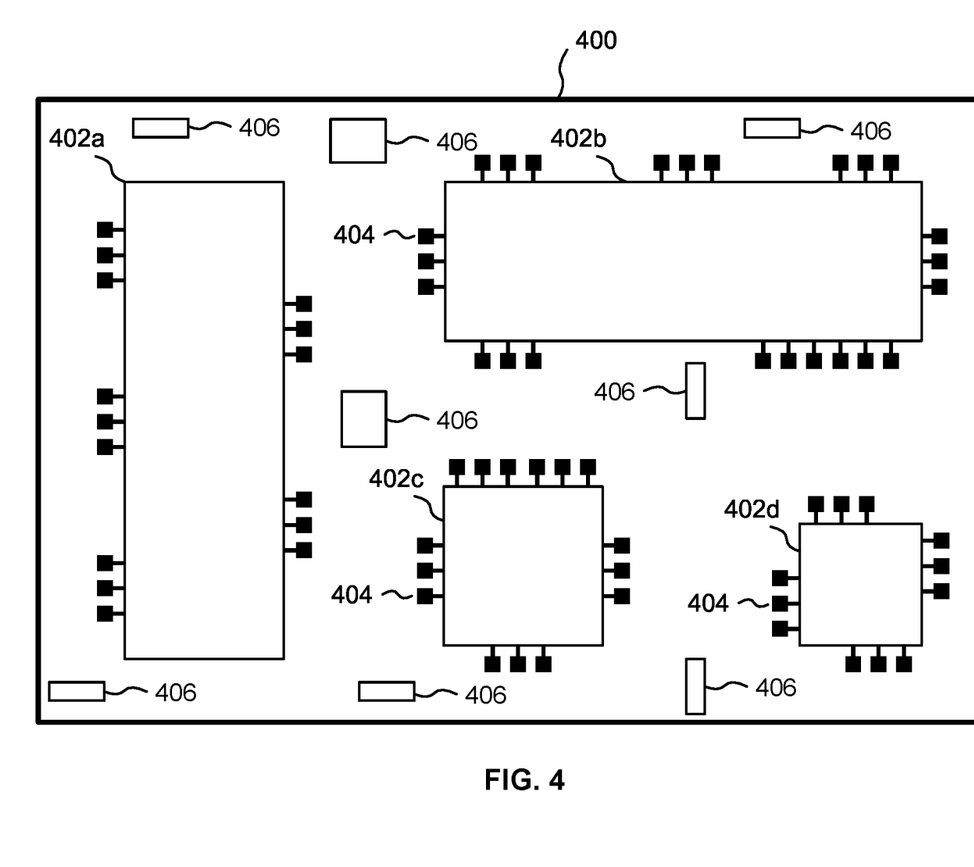
FIG. 4 is a top plan view of a substrate that may be, for example, a printed circuit board or chip module substrate (e.g., a thin-film tile).

As one example of further integration of embodiments of the present invention with other components, FIG. 4 is a top plan view of a substrate 400 that may be, for example, a printed circuit board or chip module substrate (e.g., a thin-film tile). In the illustrated example, the substrate 400 includes multiple ICs 402a-402d having terminal pads 404 which would be interconnected by conductive vias and/or traces on and/or within the substrate 400 or on the opposite (back) surface of the substrate 400 (to avoid clutter, the surface conductive traces are not shown and not all terminal pads are labelled). The ICs 402a-402d may embody, for example, signal switches, active filters, amplifiers (including one or more LNAs), and other circuitry. For example, IC 402b may incorporate one or more instances of an improved driver circuit high-side driver 106a of the type shown in FIG. 3A (optionally, a low-side driver 106b, a half-bridge power stage 102, and/or control circuitry 110 may be included in the same IC).

The substrate 400 may also include one or more passive devices 406 embedded in, formed on, and/or affixed to the substrate 400. While shown as generic rectangles, the passive devices 406 may be, for example, filters, capacitors, inductors, transmission lines, resistors, planar antennae elements, transducers (including, for example, MEMS-based transducers, such as accelerometers, gyroscopes, microphones, pressure sensors, etc.), batteries, etc., interconnected by conductive traces on or in the substrate 400 to other passive devices 406 and/or the individual ICs 402a-402d. The front or back surface of the substrate 400 may be used as a location for the formation of other structures.

Methods

Figure 5:
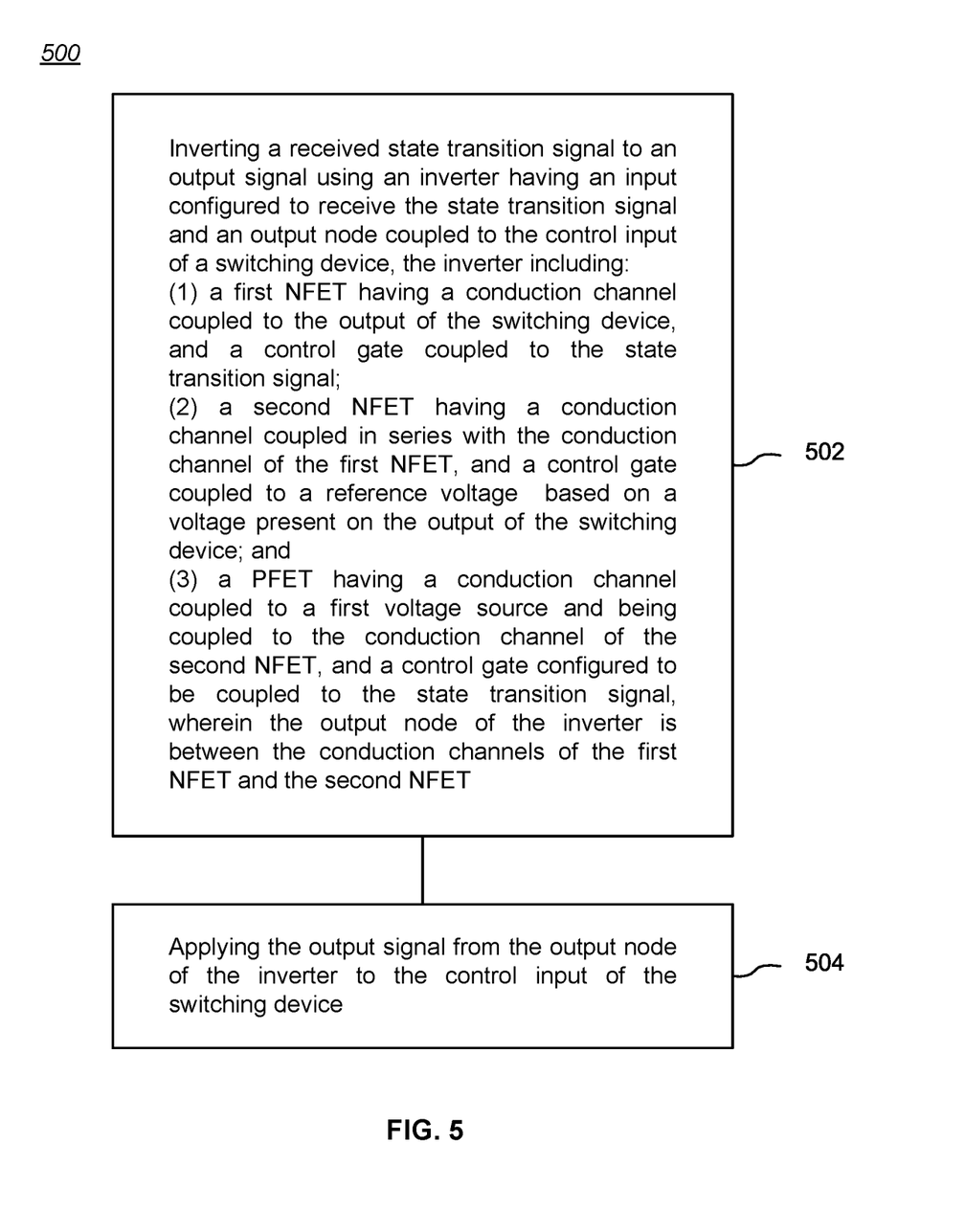
FIG. 5 is a process flow chart showing one method for providing a drive voltage for a switching device.

Another aspect of the invention includes methods for providing a drive voltage for a switching device. For example, FIG. 5 is a process flow chart 500 showing one method for providing a drive voltage for a switching device (an NFET in this example). The method includes inverting a received state transition signal to an output signal using an inverter having an input configured to receive the state transition signal and an output node coupled to the control input of a switching device, the inverter including: (1) a first NFET having a conduction channel coupled to the output of the switching device, and a control gate coupled to the state transition signal; (2) a second NFET having a conduction channel coupled in series with the conduction channel of the first NFET, and a control gate coupled to a reference voltage based on a voltage present on the output of the switching device; and (3) a PFET having a conduction channel coupled to a first voltage source and being coupled to the conduction channel of the second NFET, and a control gate configured to be coupled to the state transition signal, wherein the output node of the inverter is between the conduction channels of the first NFET and the second NFET (Block 502); and applying the output signal from the output node of the inverter to the control input of the switching device (Block 504).

A similar method may be used when the switching device is a PFET. The method includes inverting a received state transition signal to an output signal using an inverter having an input configured to receive the state transition signal and an output node coupled to the control input of a switching device, the inverter including: (1) a first PFET having a conduction channel coupled to the input of the switching device, and a control gate coupled to the state transition signal; (2) a second PFET having a conduction channel coupled in series with the conduction channel of the first PFET, and a control gate coupled to a reference voltage based on a voltage present on the input of the switching device; and (3) an NFET having a conduction channel coupled to a first voltage potential and being coupled to the conduction channel of the second NFET, and a control gate configured to be coupled to the state transition signal, wherein the output node of the inverter is between the conduction channels of the first PFET and the second PFET; and applying the output signal from the output node of the inverter to the control input of the switching device.

Fabrication Technologies & Options

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

With respect to the figures referenced in this disclosure, the dimensions for the various elements are not to scale; some dimensions may be greatly exaggerated vertically and/or horizontally for clarity or emphasis. In addition, references to orientations and directions (e.g., "top", "bottom", "above", "below", "lateral", "vertical", "horizontal", etc.) are relative to the example drawings, and not necessarily absolute orientations or directions.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies.

However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

CONCLUSION

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A driver circuit including:
   (a) a reference circuit having an input configured to be coupled to an output of a switching device and an output providing a reference voltage based on a voltage present on the output of the switching device; and
   (b) an inverter having an input configured to receive a state transition signal and an output configured to be coupled to a control input of the switching device, the inverter including:
   (1) a first NFET having a conduction channel configured to be coupled to the output of the switching device, and a control gate configured to be coupled to the state transition signal;
   (2) a second NFET having a conduction channel coupled in series with the conduction channel of the first NFET, and a control gate coupled to the reference voltage output of the reference circuit; and
   (3) a PFET having a conduction channel configured to be coupled to a first voltage source and being coupled to the conduction channel of the second NFET, and a control gate configured to be coupled to the state transition signal;
   wherein the output of the inverter is a node between the conduction channels of the first NFET and the second NFET.

2. The invention of claim 1, further including a buffer circuit coupled to the input of the inverter and configured to receive the state transition signal.

3. The invention of claim 1, wherein the switching device is an NFET.

4. The invention of claim 1, wherein the switching device includes an input configured to be coupled to a second voltage source providing a voltage lower than a voltage of the first voltage source.

5. The invention of claim 1, further including the switching device.

6. The invention of claim 1, wherein the reference circuit is configured to provide a regulated voltage to the control gate of the second NFET so as to make the second NFET substantially conductive at the beginning of a low-to-high voltage transition at the control input of the switching device.

7. A driver circuit including:
   (a) a reference circuit having an input configured to be coupled to an output of a first switching device, and an output providing a reference voltage based on a voltage present on the output of the switching device;
   (b) a first inverter having an input configured to receive a first state transition signal and an output configured to be coupled to a control input of the first switching device, the inverter including:
   (1) a first NFET having a conduction channel configured to be coupled to the output of the first switching device, and a control gate configured to be coupled to the first state transition signal;
   (2) a second NFET having a conduction channel coupled in series with the conduction channel of the first NFET, and a control gate coupled to the reference voltage output of the reference circuit; and
   (3) a first PFET having a conduction channel configured to be coupled to a first voltage source and being coupled to the conduction channel of the second NFET, and a control gate configured to be coupled to the first state transition signal;
   wherein the output of the first inverter is a node between the conduction channels of the first NFET and the second NFET; and
   (c) a second inverter having an input configured to receive a second state transition signal and an output configured to be coupled to a control input of a second switching device, the inverter including:
   (1) a third NFET having a conduction channel configured to be coupled to the output of the second switching device, and a control gate configured to be coupled to the second state transition signal; and
   (2) a second PFET having a conduction channel configured to be coupled to a second voltage source and being coupled to the conduction channel of the third NFET, and a control gate configured to be coupled to the second state transition signal;
   wherein the output of the second inverter is a node between the conduction channels of the third NFET and the second PFET.

8. The invention of claim 7, further including at least one buffer circuit coupled to the input of a respective one of the first or second inverters and configured to receive a respective first or second state transition signal.

9. The invention of claim 7, wherein the first and second switching devices are NFETs.

10. The invention of claim 7, wherein the first switching device includes an input configured to be coupled to an input voltage source providing a voltage lower than a voltage of the first voltage source.

11. The invention of claim 10, wherein the second voltage source is derived from the input voltage source.

12. The invention of claim 7, further including the first and second switching devices.

13. The invention of claim 7, wherein the reference circuit is configured to provide a regulated voltage to the control gate of the second NFET so as to make the second NFET substantially conductive at the beginning of a low-to-high voltage transition at the control input of the first switching device.

14. A circuit including:
(a) a half-bridge power stage including:
  (1) a first switching device having a control input, an output, and a conduction channel coupled to the output of the first switching device and configured to be coupled to an input voltage source; and
  (2) a second switching device having a control input, an output, and a conduction channel coupled between the output of the first switching device and the output of the second switching device;
(b) a reference circuit having an input coupled to the output of the first switching device, and an output providing a reference voltage based on a voltage present on the output of the first switching device;
(c) a first inverter having an input configured to receive a first state transition signal and an output coupled to the control input of the first switching device, the inverter including:
  (1) a first NFET having a conduction channel coupled to the output of the first switching device, and a control gate configured to be coupled to the first state transition signal;
  (2) a second NFET having a conduction channel coupled in series with the conduction channel of the first NFET, and a control gate coupled to the reference voltage output of the reference circuit; and
  (3) a first PFET having a conduction channel configured to be coupled to a first voltage source and being coupled to the conduction channel of the second NFET, and a control gate configured to be coupled to the first state transition signal;
wherein the output of the first inverter is a node between the conduction channels of the first NFET and the second NFET; and
(d) a second inverter having an input configured to receive a second state transition signal and an output coupled to the control input of the second switching device, the inverter including:
  (1) a third NFET having a conduction channel coupled to the output of the second switching device, and a control gate configured to be coupled to the second state transition signal; and
  (2) a second PFET having a conduction channel configured to be coupled to a second voltage source and being coupled to the conduction channel of the third NFET, and a control gate configured to be coupled to the second state transition signal;
wherein the output of the second inverter is a node between the conduction channels of the third NFET and the second PFET.

15. The invention of claim 14, further including at least one buffer circuit coupled to the input of a respective one of the first or second inverters and configured to receive a respective first or second state transition signal.

16. The invention of claim 14, wherein the first and second switching devices are NFETs.

17. The invention of claim 14, wherein the input voltage source provides a voltage lower than a voltage of the first voltage source.

18. The invention of claim 14, wherein the second voltage source is derived from the input voltage source.

19. The invention of claim 14, wherein the reference circuit is configured to provide a regulated voltage to the control gate of the second NFET so as to make the second NFET substantially conductive at the beginning of a low-to-high voltage transition at the control input of the first switching device.

* * * * *

UNITED STATES PATENT AND TRADEMARK OFFICE
CERTIFICATE OF CORRECTION

PATENT NO. : 12,261,518 B2
APPLICATION NO. : 17/969557
DATED : March 25, 2025
INVENTOR(S) : Gary Chunshien Wu Page 1 of 1

It is certified that error appears in the above-identified patent and that said Letters Patent is hereby corrected as shown below:

In the Specification

In the DETAILED DESCRIPTION:

Column 7, Lines 41-42 change "$V_{DD\_HV}=3V$, $V_{DD\_EV}=1.5V$," to --$V_{DD\_HV}=3V$, $V_{DD\_LV}=1.5V$,--.

Signed and Sealed this
Twenty-second Day of April, 2025

Coke Morgan Stewart
*Acting Director of the United States Patent and Trademark Office*